United States Patent
Kao

(10) Patent No.: US 6,826,800 B2
(45) Date of Patent: Dec. 7, 2004

(54) INSERT-AND-PLAY CASTER ASSEMBLY

(76) Inventor: Yu-Chien Kao, 2, Alley 1, Lane 29, Sec. 2, Pei-Shin Rd., Shin-Tien City, Taipei Hsien (TW)

( * ) Notice: Subject to any disclaimer, the term of this patent is extended or adjusted under 35 U.S.C. 154(b) by 0 days.

(21) Appl. No.: 10/331,758

(22) Filed: Dec. 31, 2002

(65) Prior Publication Data

US 2004/0123422 A1 Jul. 1, 2004

(51) Int. Cl.$^7$ .............................................. B60B 33/00
(52) U.S. Cl. ............................ 16/31 R; 16/29; 16/30
(58) Field of Search ............................ 411/456, 451.3, 411/466, 467

(56) References Cited

U.S. PATENT DOCUMENTS

| | | | | |
|---|---|---|---|---|
| 8,180 A | * | 6/1851 | Jenkinson | 264/540 |
| 242,441 A | * | 6/1881 | Feick | 16/40 |
| 450,753 A | * | 4/1891 | Cary | 217/70 |
| 835,492 A | * | 11/1906 | Baker | 16/30 |
| 1,029,795 A | * | 6/1912 | Covey | 16/39 |
| 1,456,395 A | * | 5/1923 | Moll et al. | 43/109 |
| 2,282,631 A | * | 5/1942 | Winship | 411/516 |
| 3,478,381 A | * | 11/1969 | Schultz, Jr. | 16/29 |
| 3,761,107 A | * | 9/1973 | Docherty et al. | 280/659 |
| 4,641,474 A | * | 2/1987 | Cannarsa | 52/514 |
| 4,940,252 A | * | 7/1990 | Seib | 280/418.1 |
| 5,331,717 A | * | 7/1994 | Joslin et al. | 16/35 R |
| 5,924,165 A | * | 7/1999 | Gierer et al. | 15/323 |
| 6,550,100 B2 | * | 4/2003 | Drucker et al. | 16/31 R |

* cited by examiner

Primary Examiner—Robert J. Sandy
Assistant Examiner—André L. Jackson
(74) Attorney, Agent, or Firm—Bacon & Thomas

(57) ABSTRACT

An insert-and-play caster assembly. The assembly includes a base frame and a caster for assisting transporting loads. The base frame can be easily inserted and fixed to the downward surface of a load, and thus one or more such insert-and-play casters are attached to a load so as to facilitate delivering the load. One section of the base frame is an insertion section composed of a number of staggered insertion plates. The insertion section is inserted into a seam of a load, such as a packing box. The insertion section provides a firm attachment to the load, and then the caster underneath the base frame becomes capable of assisting transporting loads, leading to the benefits of simple applicability and effort saving.

4 Claims, 6 Drawing Sheets

INSERT-AND-PLAY CASTER ASSEMBLY

BACKGROUND OF THE INVENTION (a) Field of the Invention

The present invention relates to an insert-and-play caster assembly, comprising a base frame and a caster. By attaching the base frame to a load (such as a packing box), the caster is then capable of assisting transporting the load, leading to the benefits of simple applicability and effort saving.

(b) Description of the Prior Art

The casters of the prior art are attached to the downward surface of a load for providing an effort-saving delivery. However, the means of attachment of the conventional casters is either directly fixing a caster underneath a load or, indirectly, installing a number of casters on a frame or a cart especially designed for carrying loads. The installation configurations of the conventional casters belong to a permanent combination, which is incapable of decomposing and recomposing according to various circumstantial needs. Especially for moving packing boxes with heavy contents or large sizes, it would be difficult without a cart at hand.

SUMMARY OF THE INVENTION

The major purpose of the present invention is providing an insert-and-play caster assembly, comprising a base frame and a caster, for assisting transporting loads. The insertion section of the base frame, which is composed of a number of staggered insertion plates, can be inserted into a seam of a load (such as a packing box). The base frame is firmly attached to load by clipping or occluding of the insertion plates with a wall of the load. Therefore, the caster underneath the base frame becomes capable of assisting transporting loads, leading to the benefits of simple applicability and effort saving.

It is a secondary purpose that the present invention having a number of staggered insertion plates can achieve better attachment by one or more rising teeth formed on the inward surfaces of the plates, producing an occluding effect to the attached load.

It is a further purpose that the present invention has sawteeth, arranged in a row or in an evenly distributed way, formed on an edge or in a properly chosen position on the load-contacting surface of the section to which the caster is connected. The sawteeth form better attachment with the downward side of a load by occluding, so that the combination of the plug-and play caster assembly and a load is strengthened.

As a further purpose, the present invention provides an insert-and-play caster assembly wherein the caster underneath the base frame is rotatable over 360 degrees about a vertical axis of rotation, which facilitating agile direction control during a load delivery.

DETAILED DESCRIPTION OF THE PREFERRED EMBODIMENTS

Figure 1:
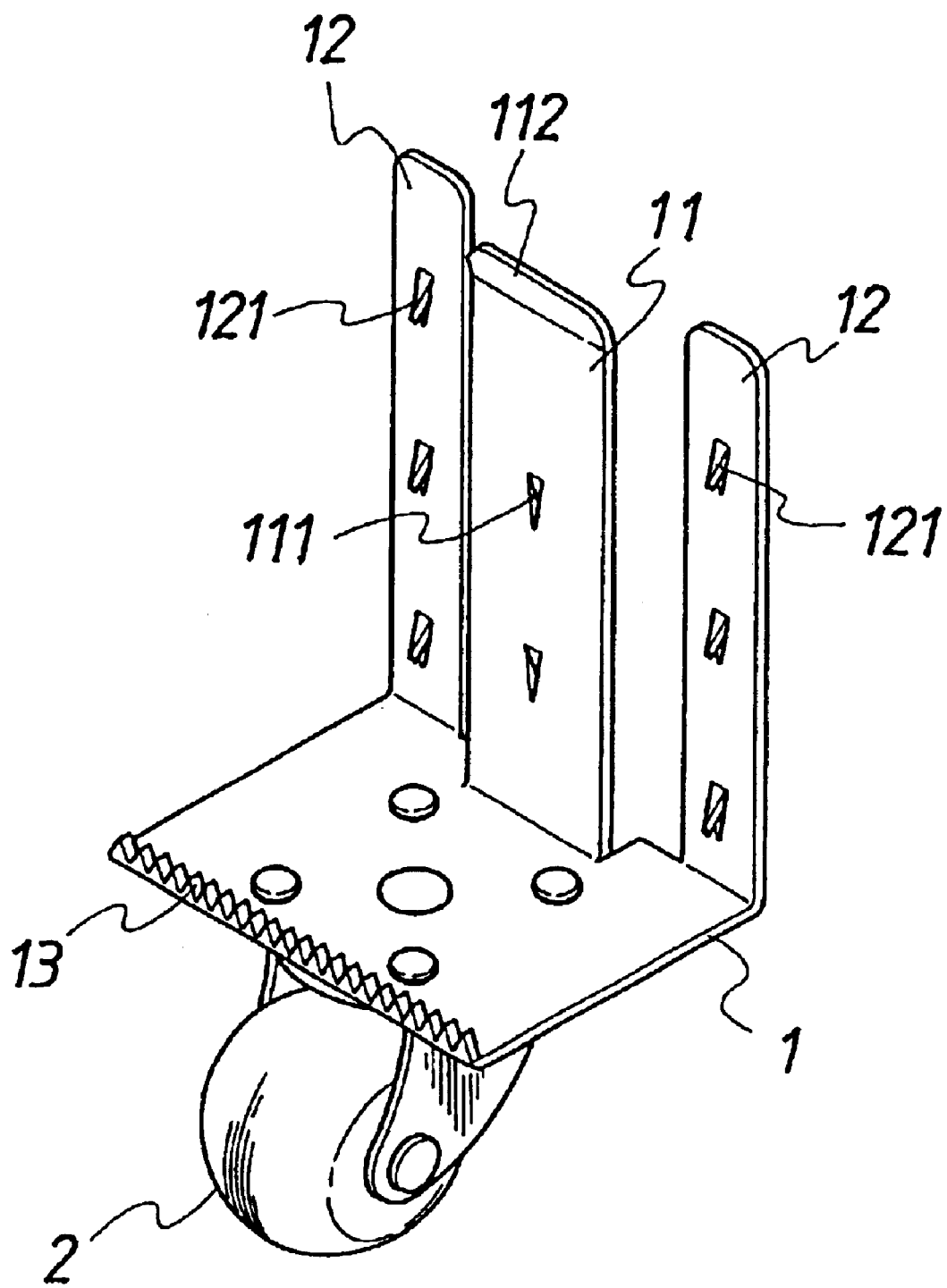
FIG. 1 is a perspective view showing the combination of the present invention.
Figure 2:
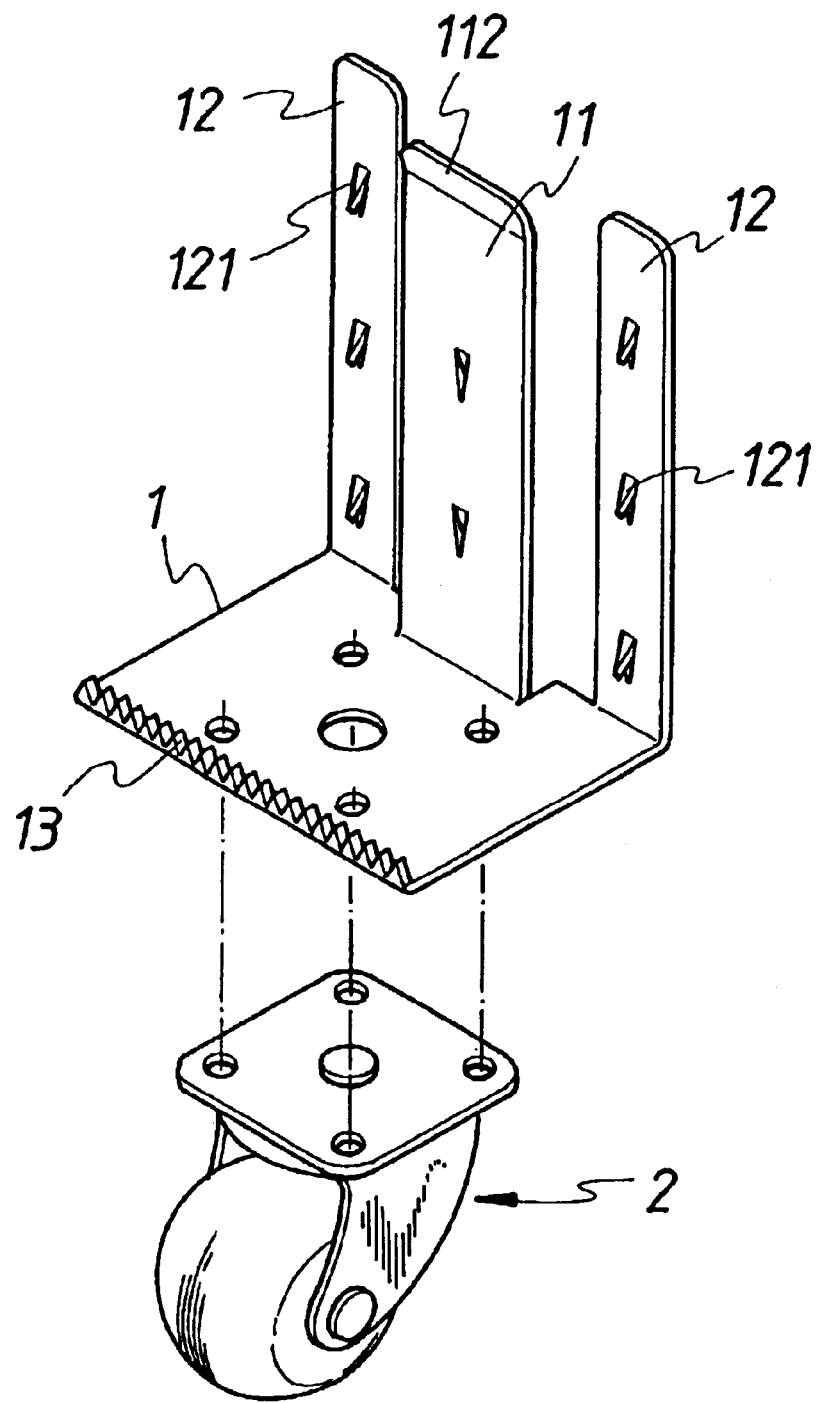
FIG. 2 is an exploded perspective view of the present invention.

As shown in FIGS. 1 and 2, the insert-and-play caster assembly of the present invention comprises mainly a base frame 1 and a caster 2. The base frame 1 is an L-shaped plate consisting of a erected section and a horizontal section. The erected section is the insertion section composed of a number of insertion plates 11, 12, which are staggered with a fixed interval in two rows. The insertion plates 11, 12 in each row have rising teeth 111, 121 extending into the interval; the rising teeth 111, 121 can be straightforward formed on the insertion plates 11, 12 by stamping. Further, there are sawteeth 13 formed on any edge or in a properly chosen position of the horizontal section of the base frame 1; the saw teeth 13 can be arranged in a row or in an evenly distributed way.

Figure 3:
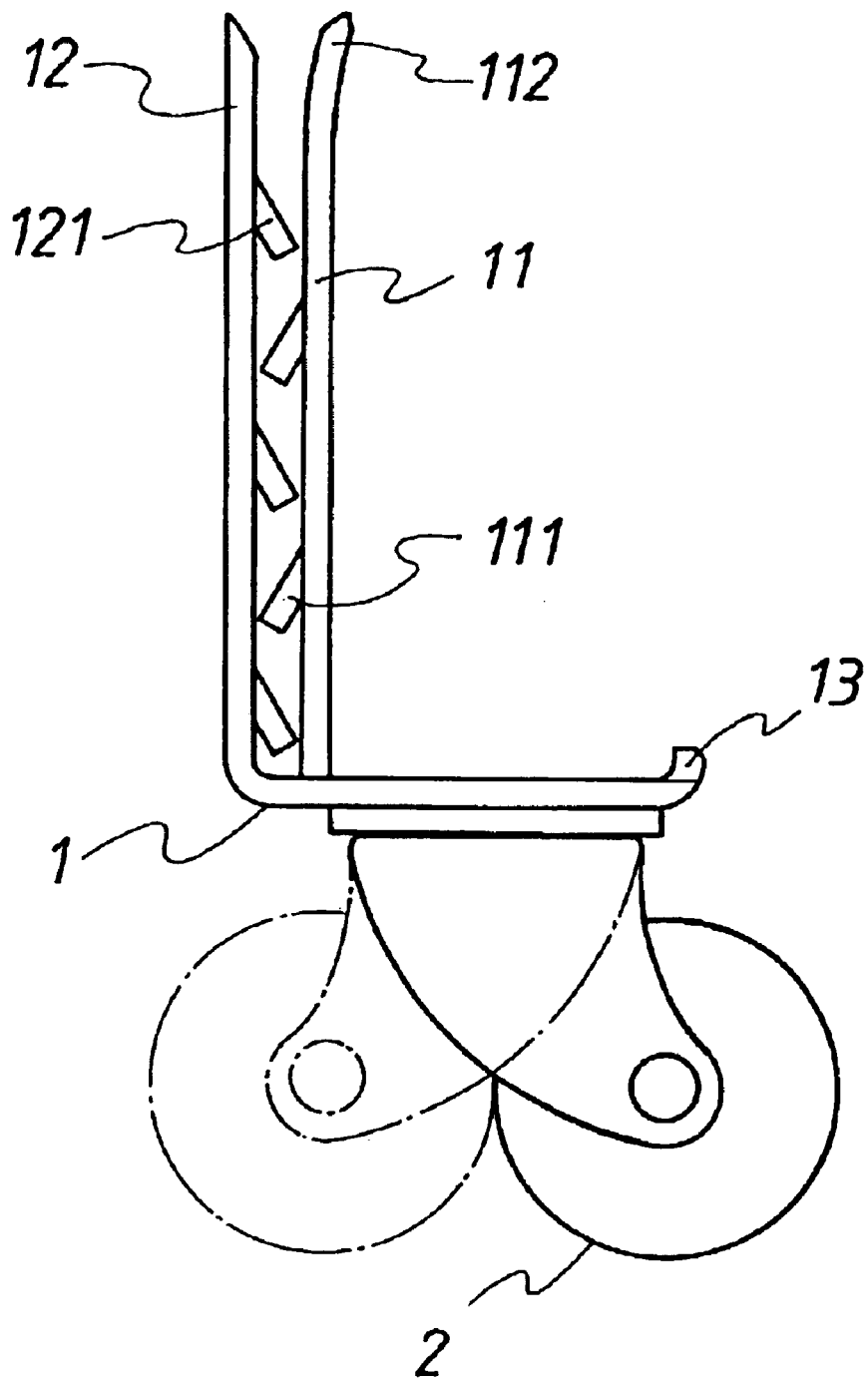
FIG. 3 is a side view of the present invention illustrating a caster being freely rotatable.

A caster 2 is fixed on the downward surface of the horizontal section of the base frame 1 by riveting or locking, which is rotatable over 360 degrees about a vertical axis of rotation for agile direction control as the caster is in motion, as shown in FIG. 3.

Figure 4:
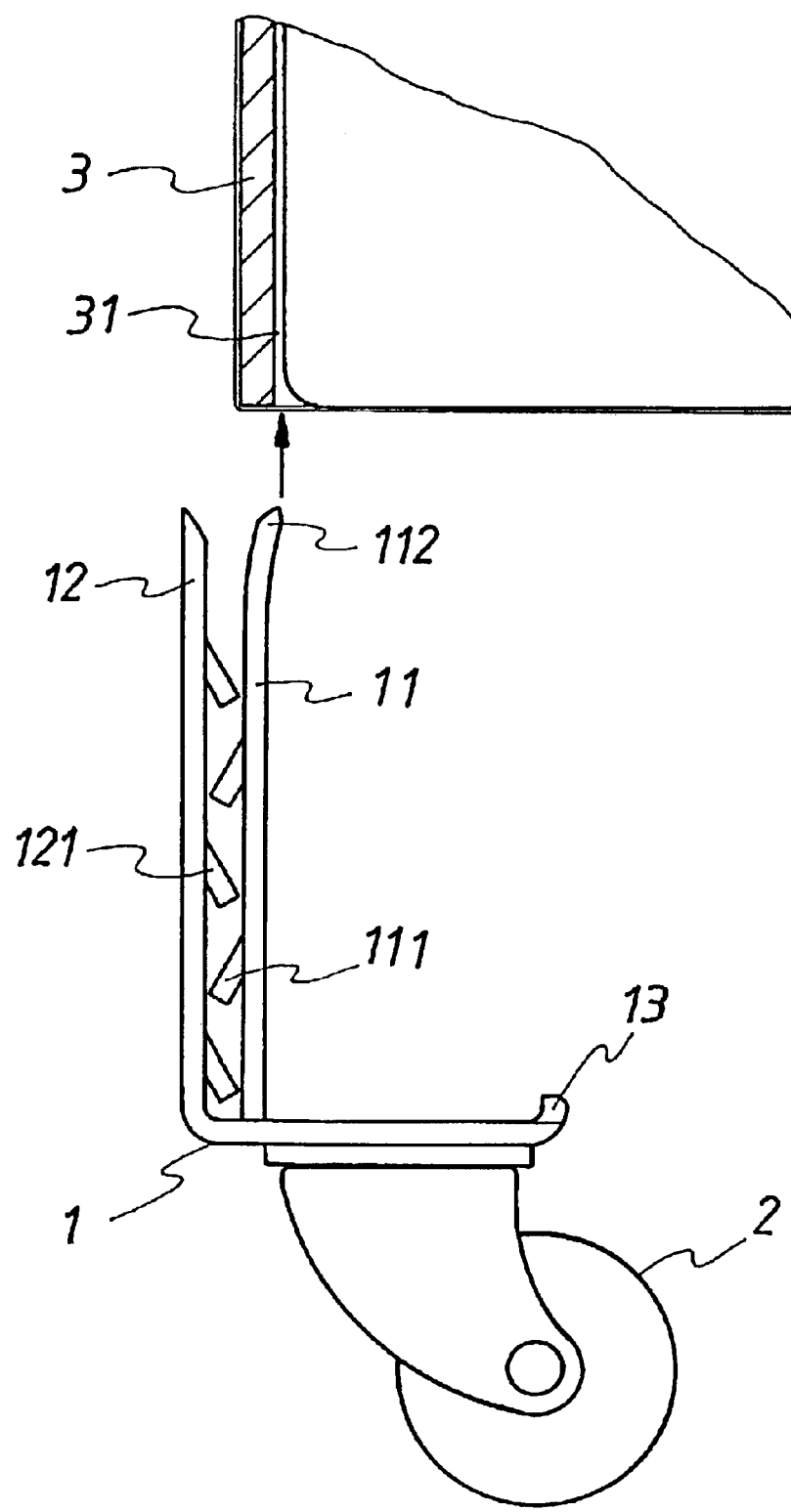
FIG. 4 is a diagram showing the present invention before it is inserted into a load (packing box).
Figure 5:
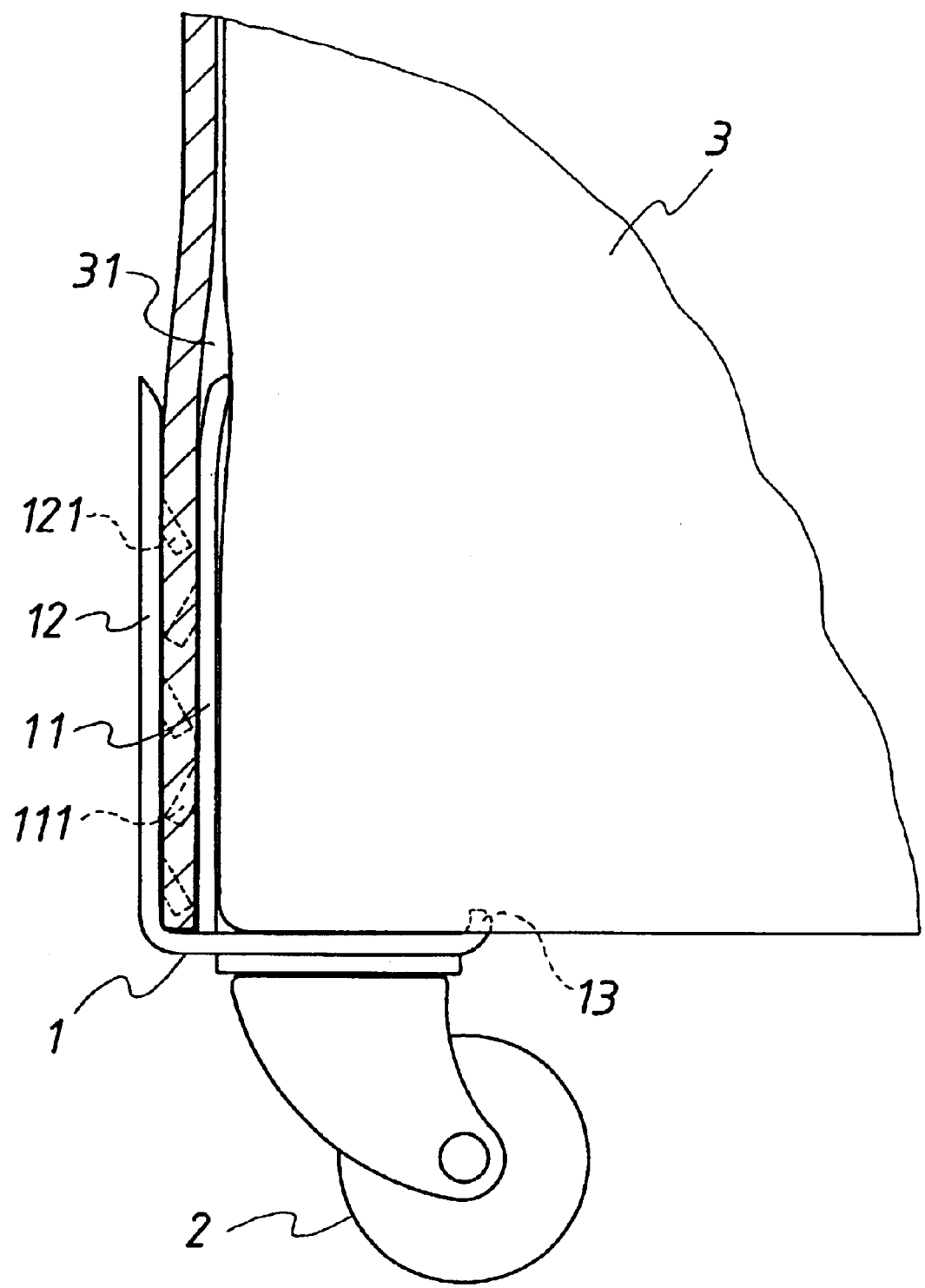
FIG. 5 is a diagram showing the present invention after it is inserted into a load (packing box).
Figure 6:
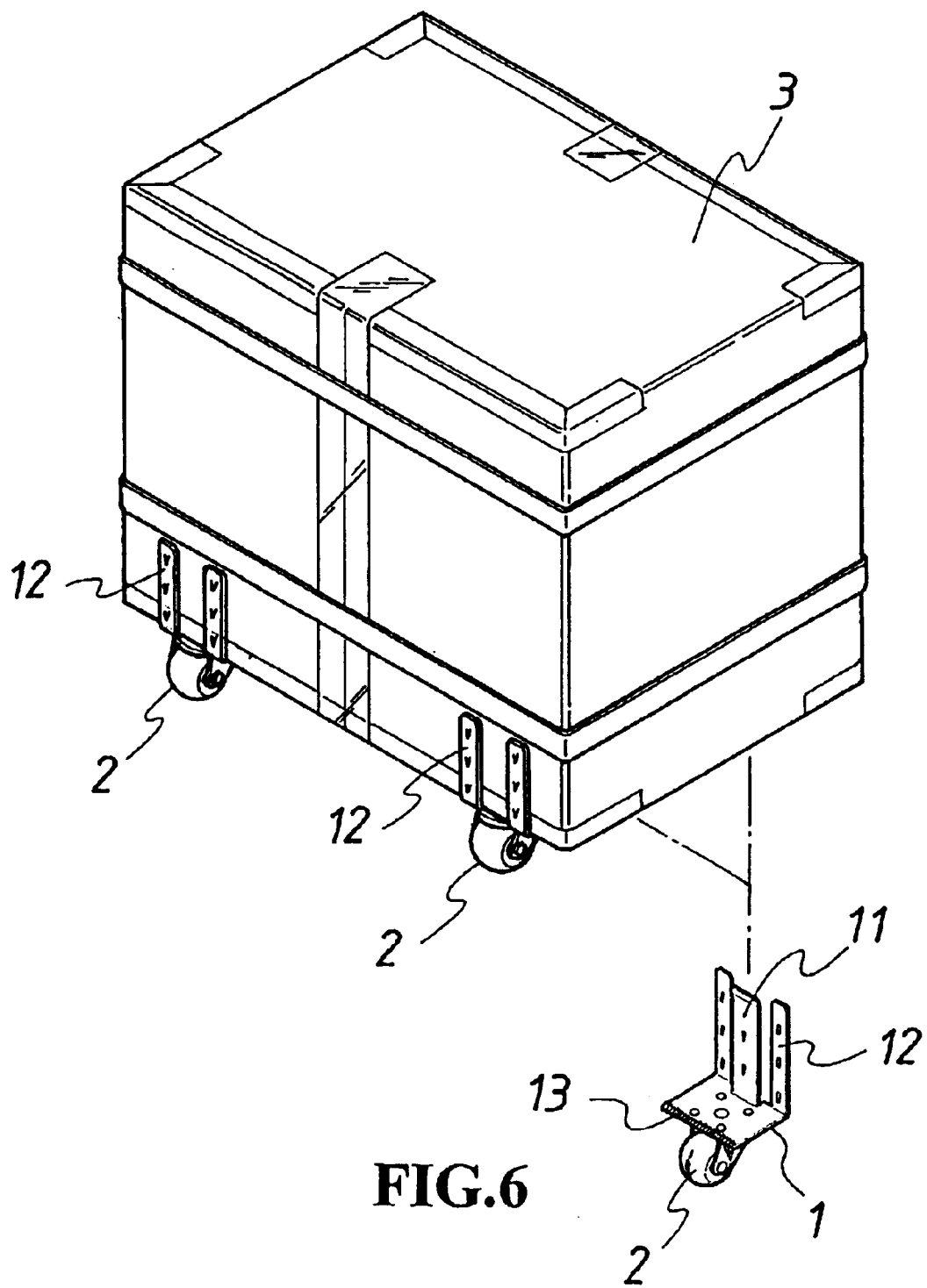
FIG. 6 is a diagram showing the utilization of the present invention when attached to a load (packing box).

Based on the above-mentioned composition, the insert-and-play caster assembly is utilized by inserting the erected section of the base frame 1 into a seam (such as the seam 31 shown in FIG. 4) of a load (such as the packing box 3 shown in FIG. 4) and therefore the base frame 1 clipping or occluding to the packing box 3 to achieve a state of attachment, as shown in FIG. 5. One or more casters 2 can be immediately attached to the load, as shown in FIG. 6, and thereby they provide an effort-saving way to transport the load. This invention is not only easy to operate but also of structural simplicity.

The forgoing description is merely a preferred embodiment of the present invention of a play-and-play caster, which is of course not for restricting the technical range of the present invention. Various changes and modifications or equivalent applications that may be made without departing from the spirit and scope of the invention, as sought to be defined in the following claims, are thus should be included in the technical characteristics of the present invention. For example, the shape of the above-mentioned base frame 1 can be varied. As an alternative, a simple clipping device replacing the rising teeth along the insertion section of the base frame 1 is also feasible. As a further alternative, the saw teeth 13 formed on the load-contacting surface of the base frame 1 can be rearranged in any pattern that may provide better fixing. As a further improvement, the tip of the above-mentioned insertion plate II can be bent into a guiding blade 112 for facilitating the insertion of the base frame 1 into a seam of a load (packing box 3, for example).

As shown in FIGS. 3–5, the rising teeth 111, 121 are pointed towards a common plane.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An insert-and-play caster assembly comprising:

a base frame comprising an erected section and a horizontal section, the erected section comprising an insertion section composed of a number of staggered insertion plates, one or more rising teeth are formed on each of the staggered insertion plates and extend inwardly, such that the rising teeth are pointed towards a common plane;

a caster installed on a downward surface of the horizontal section of the base frame; and wherein the insertion section of the base frame is inserted into a seam of a packing box so as to combine with the load by clipping or occluding to a wall of the box, and thereby the caster on the downward surface of the base frame being applied to assist transporting the box.

2. The insert-and-play caster assembly of claim 1, wherein a number of sawteeth are formed on an edge or in a properly chosen position of the horizontal section of the base frame, and arranged in a row or in an evenly distributed way.

3. The insert-and-play caster assembly of claim 1, wherein the caster is rotatable over 360 degrees about a vertical axis of rotation.

4. The insert-and-play caster assembly of claim 1 wherein the erected section is perpendicular to the horizontal section, and therefor the base frame is an L-shaped plate.

* * * * *